United States Patent
Aida et al.

(10) Patent No.: US 6,513,633 B2
(45) Date of Patent: Feb. 4, 2003

(54) ROTATION TRANSMITTING DEVICE INCORPORATING ONE-WAY CLUTCH THEREIN

(75) Inventors: Hiroshi Aida, Kanagawa-ken (JP); Yutaka Kitamura, Tokyo (JP); Takashi Kinoshita, Tokyo (JP)

(73) Assignees: NSK Ltd., Tokyo (JP); Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/818,944

(22) Filed: Mar. 28, 2001

(65) Prior Publication Data

US 2001/0045334 A1 Nov. 29, 2001

(30) Foreign Application Priority Data

Mar. 28, 2000 (JP) ........................................ 2000-089048

(51) Int. Cl.[7] .............................................. F16D 41/06
(52) U.S. Cl. ..................................... 192/45; 192/110 B
(58) Field of Search .............................. 192/45, 41 R, 192/45.1, 45.2, 46, 44, 110 B; 188/82.1, 82.5, 82.84; 474/112, 170, 116, 117; 384/548; 310/100, 78, 92, 96, 112

(56) References Cited

U.S. PATENT DOCUMENTS 3,017,002 A 1/1962 Marland
2001/0045334 A1 * 11/2001 Aida et al. .................... 192/45

FOREIGN PATENT DOCUMENTS

| DE | 19531745 | 3/1996 |
| DE | 19626959 | 1/1998 |
| EP | 0947722 | 10/1999 |
| EP | 1138969 | * 10/2001 |
| JP | 8166027 | 6/1996 |
| JP | 271853 A | * 10/2001 |

OTHER PUBLICATIONS

Copy of Search Report EP01302845.

* cited by examiner

*Primary Examiner*—Douglas C. Butler
(74) *Attorney, Agent, or Firm*—Crowell & Moring LLP (57) ABSTRACT

A one-way clutch therein which comprises an inner diameter side member fixed to an end of a rotary shaft, an outer diameter side member disposed around the inner diameter side member, a one-way clutch disposed between a middle part in the axial direction on the outer peripheral surface of the inner diameter side member and a middle part in the axial direction on the inner peripheral surface of the outer diameter side member, and a pair of support bearings disposed between the outer peripheral surface of the inner diameter side member and the inner peripheral surface of the outer diameter side member at a position to pinch this one-way clutch from the both sides thereof in the axial direction for allowing a relative rotation between the inner diameter side member and the outer diameter side member while supporting a radial load applied on this outer diameter side member.

1 Claim, 6 Drawing Sheets

PRIOR ART

FIG. 7

PRIOR ART

FIG. 8

PRIOR ART

FIG. 9

PRIOR ART

ROTATION TRANSMITTING DEVICE INCORPORATING ONE-WAY CLUTCH THEREIN

This application claims the benefit of Japanese Patent Application No. 2000-089048 which is hereby incorporated by reference.

BACKGROUND OF THE INVENTION

1. Field of the Invention

The present invention relates to an improvement in a rotation transmitting device incorporating a one-way clutch therein which can be used typically as a driven pulley fixed to an end of a rotary shaft of an alternator which serves as a power generator in a car, or a pinion fixed to an end of a rotary shaft for constituting a starter motor of a starting system of a car.

2. Related Background Art

Figure 6:
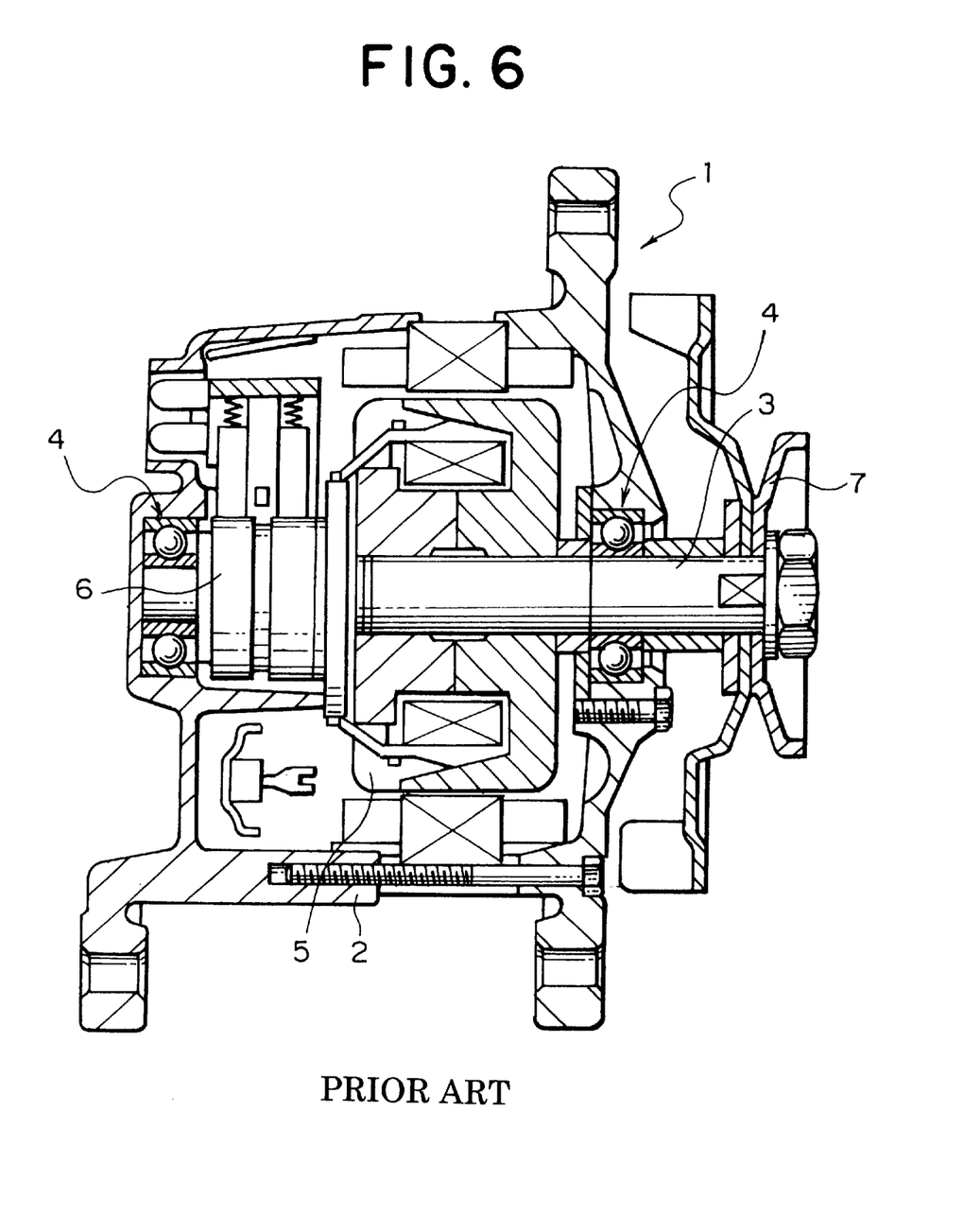
FIG. 6 is a cross-sectional view for showing a alternator which is conventionally known.

The structure of an alternator which generates electric power necessary for a car by using an engine of the car as its driving source is disclosed, for instance, in Japanese Patent Application Laid-Open No. 7-139550. FIG. 6 illustrates an alternator 1 which is described in the above application. Referring to FIG. 6, a rotary shaft 3 is rotatably supported by a pair of rolling bearings 4 and 4 inside a housing 2. A rotor 5 and a rectifier 6 are provided in a middle part of this rotary shaft 3. In addition, a driven pulley 7 is fixed to an end portion (the right end portion in FIG. 6) of this rotary shaft 3 which is protruded outward from the housing 2. In a state in which the alternator is assembled in the engine, an endless belt is wound around this driven pulley 7 so that the rotary shaft 3 is driven to rotate freely by means of a crank shaft of the engine.

As the driven pulley 7 described above, a pulley which is simply fixed to the rotary shaft 3 has been conventionally employed. However, various types of a pulley device incorporating a one-way clutch therein have been recently proposed as rotation transmitting devices incorporating a one-way clutch therein which are arranged to transmit the driving power from the endless belt to the rotary shaft when the running speed of the endless belt is fixed or on the increase, while allowing relative rotation between the driven pulley and the rotary shaft when the running speed of the endless belt is on the decrease. Some of such pulley devices have been put into practice use. For instance, pulley devices incorporating a one-way clutch therein and having a function as described above are disclosed in Japanese Patent Application Laid-Open Nos. 56-101353, 7-317807, 8-61443, 8-226462 and 7-72585, French Patent Publication FR2726059A1, and the like.

Figure 7:
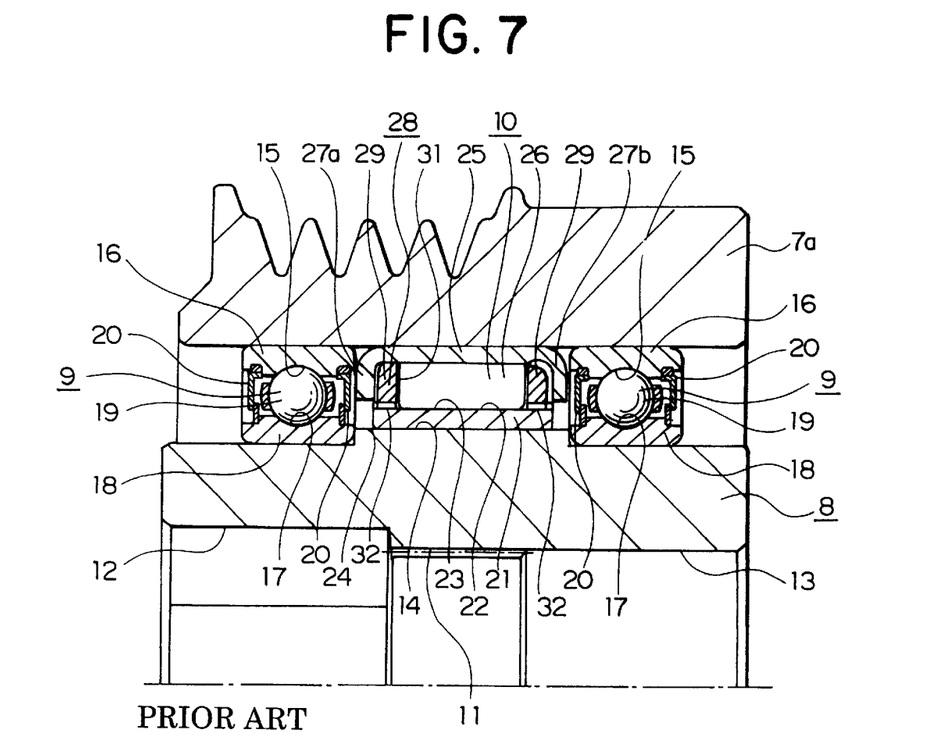
FIG. 7 is a half cross-sectional view for showing a conventional structure.
Figure 8:
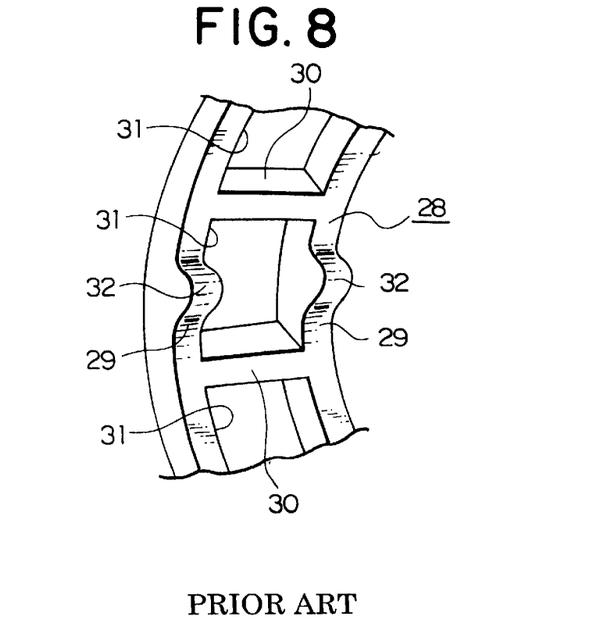
FIG. 8 is a partial perspective view of a clutch retainer.
Figure 9:
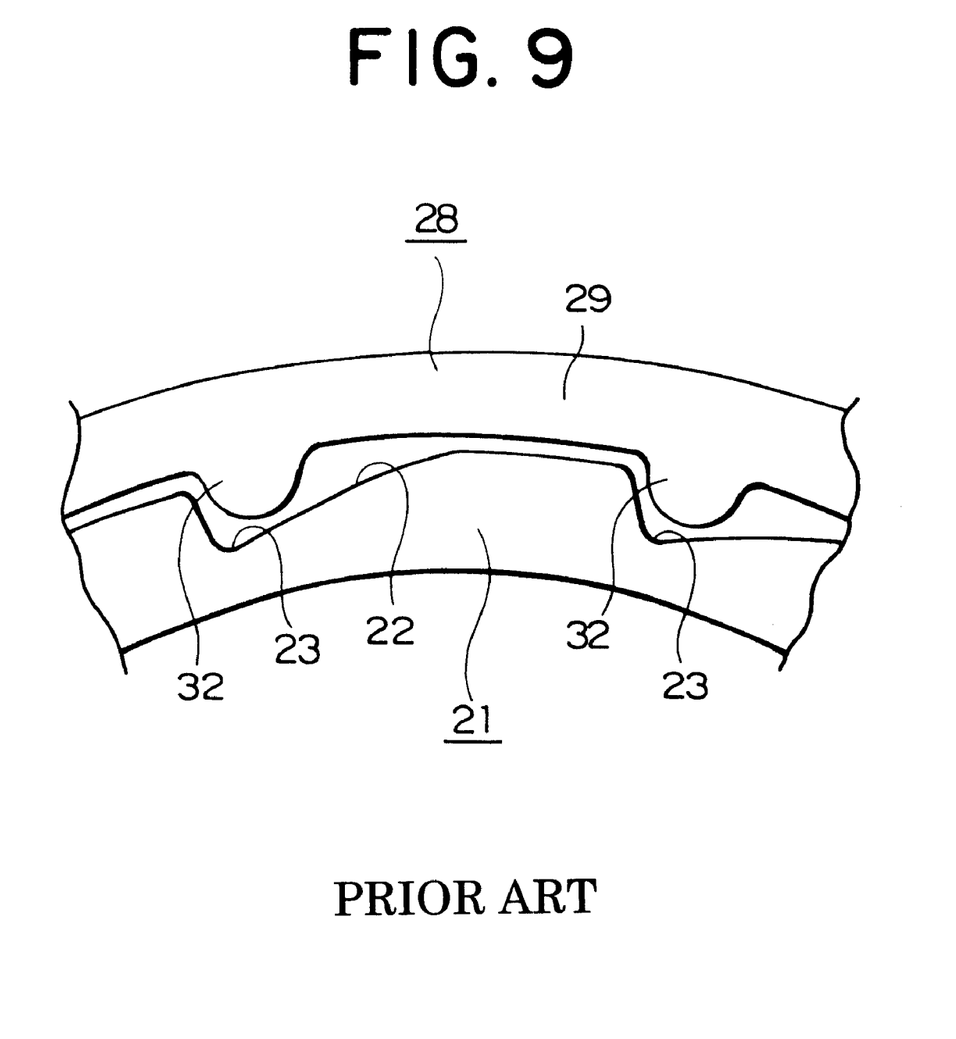
FIG. 9 is a partial lateral view for showing only a clutch inner race and a clutch retainer taken out of the structure.

FIGS. 7 to 9 illustrate a pulley device incorporating a one-way clutch conventionally known by being described in either of the above publications. This pulley device incorporating a one-way clutch therein comprises a sleeve 8 which serves as an inner diameter side member and can be fitted and fixed onto the rotary shaft 3 of the alternator 1 (see FIG. 6). Around this sleeve 8, there is provided a driven pulley 7a which serves as an outer diameter side member in a cylindrical form to be concentric with this sleeve 8. Then, a pair of support bearings 9, 9 and a roller clutch 10 serving as the one-way clutch are provided between the outer peripheral surface of the sleeve 8 and the inner peripheral surface of the driven pulley 7a.

The sleeve 8 is formed to be cylindrical as a whole, and is fitted and fixed onto an end portion of the rotary shaft 3 of the alternator 1 to be rotatable with this rotary shaft 3. To this end, in the illustrated example, a threaded hole portion 11 is formed in a middle part on the inner peripheral surface of the sleeve 8, and this threaded hole portion and a male screw portion which is formed on the outer peripheral surface at the tip end portion of the rotary shaft 3 are arranged to be thread-engaged with each other. A latch hole portion 12 having a hexagonal cross section is also formed at the tip end portion on the inner peripheral surface of the sleeve 8 (the left end portion in FIG. 7). The tip end portion of a tool such as a hexagonal wrench can be latched by this latch hole portion 12. Furthermore, the base portion (the right end portion in FIG. 7) of the inner peripheral surface of the sleeve 8 serves as a circular hole portion 13 which can be fitted on a portion near the middle part of the tip end portion of the rotary shaft 3 with no play. Note that a spline engagement, non-circular fitting, key engagement, or another arrangement may be employed as the arrangement for combining the sleeve 8 with the rotary shaft 3 in such a manner that they are not relatively rotated with each other. In addition, the central portion of the outer peripheral surface of the sleeve 8 serves as a large diameter portion 14 which has a larger diameter size than that of another portion.

On the other hand, a tip half portion of the outer peripheral surface of the driven pulley 7a has a cross section in a waveform along the widthwise direction, around which a part of the endless belt called a poly-V belt can be wound. Then, the above-mentioned roller clutch 10 is disposed in a middle part in the axial direction of a space existing between the outer peripheral surface of the sleeve 8 and the inner peripheral surface of the driven pulley 7a, while the support bearings 9, 9 are respectively disposed at positions to sandwich this roller clutch 10 from the both sides in the axial direction near the both ends of this space in the axial direction.

Out of these members, the support bearings 9, 9 allow, while supporting a radial load applied on the driven pulley 7a, a relative rotation between this driven pulley 7a and the sleeve 8. In the illustrated example, ball bearings of a deep groove type are used as the support bearings 9, 9. More specifically, these support bearings 9, 9 comprise outer races 16, 16 respectively having outer raceways 15, 15 of the deep groove type on the respective inner peripheral surfaces thereof, inner races 18, 18 respectively having inner raceways 17, 17 of the deep groove type on the respective outer peripheral surfaces thereof, and balls 19, 19 provided in plural sets as capable of rolling between the outer raceways 15, 15 and the inner raceways 17, 17. Then, the outer races 16, 16 are fitted and fixed onto the inner peripheral surface near the both ends of the driven pulley 7a, while the inner races 18, 18 are onto the outer peripheral surfaces near the both ends of the sleeve 8, respectively. In this state, the inner races 18, 18 in the axial direction are brought into contact with the respective end surfaces (step surfaces) in the axial direction of the large diameter portion 14. Also, in the illustrated example, seal rings 20, 20 are provided between the inner peripheral surfaces of the both end portions of the outer races 16, 16 and the outer peripheral surfaces of the both end portions of the inner races 18, 18, respectively, thereby sealing openings at the both ends of the space provided with the balls 19, 19 described above.

It is preferable that a communication hole is formed in a part of each of the seal rings 20, 20 on the side facing a space which is formed by and between the support bearings 9, 9, out of the above-described seal rings 20, 20, so that this space and the space receiving therein the balls 19, 19 of the support bearings 9, 9 are communicated to each other, in order to prevent excessive rise of the pressure inside the space formed by and between the support bearings 9, 9 when the support bearings 9, 9 are inserted with pressure between the inner peripheral surface of the driven pulley 7a and the outer peripheral surface of sleeve 8. When the outer races 16, 16 are interference-fitted and fixed into the inner peripheral surface of the driven pulley 7a, it is preferable that, out of the inner peripheral surface of this driven pulley 7a, a part in which the outer races 16, 16 are fitted is made a large diameter portion, while a part in which a clutch outer race 25, which is described later, is fitted is made a small diameter portion, so that the large diameter portion and the small diameter portion are in a stepped form continued by the paired step surfaces, since a flaw in a groove shape is easily created along the axial direction on the inner peripheral surface of the driven pulley 7a when the clutch outer race 25 is thrust into the inner peripheral surface of this driven pulley 7a in case that the inner peripheral surface of the driven pulley 7a is a single cylindrical surface. Then, when such a groove is created, there is a possibility that the grease enclosed in the gap between the both support bearings 9, 9 is leaked out through the gap between the groove and the outer peripheral surfaces of the outer races 16, 16. On the contrary, if the size of a part in which the clutch outer race 25 is fitted is set to be smaller than that of a part in which the outer races 16, 16 are fitted, such a flaw as described above can be prevented.

The roller clutch 10 is arranged to allow transmission of the force of rotation between the driven pulley 7a and the sleeve 8 only when the driven pulley 7a has a tendency to rotate in a predetermined direction relatively to the sleeve 8. In order to arrange the roller clutch 10 as described above, the clutch inner race 21 is interference-fitted and fixed onto the large diameter portion 14 of the sleeve 8. This clutch inner race 21 is formed to be cylindrical as a whole by press working, or other plastic working, of a steel plate of, for instance, cemented steel, and on the outer surface of which, a cam surface 22 is formed. More specifically, a plurality of concave portions 23, 23 each called a ramp portion are formed on the outer peripheral surface of the clutch inner race 21 at regular intervals in the circumferential direction, whereby the outer peripheral surface serves as the cam surface 22 mentioned above. Note that, in the illustrated example, a concave chamfered portion 24 is formed on one end portion (the left end portion in FIG. 7) on the inner peripheral surface of the clutch inner race 21, and this chamfered portion 24 serves as a guide surface when the clutch inner race 21 is to be thrust with pressure into the outer peripheral surface of the large diameter portion 14.

On the contrary, out of the inner peripheral surface of the clutch outer race 25 which is interference-fitted and fixed in the middle part on the inner peripheral surface of the driven pulley 7a, at least a middle part in the axial direction in contact with rollers 26, which is described later, is simply formed as a cylindrical surface. Such clutch outer race 25 is formed to be cylindrical as a whole also by press working or other plastic working of a steel plate of, for instance, cemented steel, and inward flange portions 27a and 27b are formed at the both ends of the clutch outer race 25 in the axial direction. Note that one flange portion 27a (the left one in FIG. 7) out of the two flange portions 27a and 27b is formed prior to the manufacturing of the clutch outer race 25, so that this flange portion 27a has the thickness equal to that of the cylindrical portion of the clutch outer race 25. On the other hand, the other flange portion 27b (the right one in FIG. 7) is formed after a roller 26 which is described later and the clutch retainer 28 are assembled in the clutch outer race 25 inward in the radial direction. Consequently, the flange portion 27b is formed thin.

A plurality of rollers 26 for constituting the roller clutch 10 together with the clutch inner race 21 and the clutch outer race 25 are supported to allow a slight displacement in the rolling and circumferential directions by a clutch retainer 28 which is fitted on the clutch inner race 21 to allow no rotation with respect to the clutch inner race 21. This clutch retainer 28 is formed in a cylindrical form of a cage type as a whole of synthetic resin (for instance, synthetic resin of polyamide 66, polyamide 46, polyphenylene sulfide, or the like, mixed with 20% of glass fiber). This clutch retainer 28 is provided with a pair of rim portions 29, 29 each formed in an annular shape, and a plurality of column portions 30, 30 for connecting the both rim portions 29, 29 to each other.

Portions surrounded on the four sides by the inner side surfaces of the rim portions 29, 29 and the side surfaces of the column portions 30, 30 in the circumferential direction are called the pockets 31, 31 for holding the rollers 26 to allow a slight displacement in the rolling and circumferential directions. Then, arcuate convex portions 32, 32 which are formed at a plurality of positions on the inner peripheral surfaces of the rim portions 29, 29 are engaged with the concave portions 23, 23 formed on the outer peripheral surface of the clutch inner race 21, whereby the clutch retainer 28 is attached to the clutch inner race 21 in such a manner that a relative rotation with this clutch inner race 21 is not allowed.

Between the column portions 30, 30 for constituting this clutch retainer 28 and the rollers 26, there are provided, respectively, leaf springs or springs each typically made of a synthetic resin and integrally formed with this clutch retainer 28. These springs elastically press the respective rollers 26 in the same direction with respect to the circumferential direction of the clutch retainer 28 toward a portion, out of a cylindrical gap formed between the outer peripheral surface of the cam surface 22 and the inner peripheral surface (cylindrical surface) of a middle part of the clutch outer race 25, which is narrower in the radial direction. The both end surfaces in the axial direction of the clutch retainer 28 as described above are approximated to face the inner side surfaces of the two flange portions 27a, 27b for constituting the clutch outer race 25, thereby preventing a displacement of this clutch retainer 28 in the axial direction.

By the use of the pulley device incorporating a one-way clutch arranged as described above, when the driven pulley 7a and the sleeve 8 have a tendency to rotate relatively to each other in a predetermined direction, each roller 29 enters into the narrower portion in the radial direction of the cylindrical gap, whereby the relative rotation between the driven pulley 7a and the sleeve 8 becomes impossible (in a locked state). On the other hand, when the driven pulley 7a and the sleeve 8 are rotated relatively to each other in a direction opposite to the predetermined direction, each of the rollers 26 is retracted to a portion having the greater width in the radial direction of the cylindrical gap, thereby allowing the relative rotation between the driven pulley 7a and the sleeve 8 (in an over-run state).

There are two reasons for employing the pulley device incorporating a one-way clutch for an alternator having a structure as described above, as described below. The first reason is to prolong the life of the endless belt. For instance, by the use of a diesel engine as the driving engine, a fluctuation in angular speed of rotation of the crank shaft becomes great at the time of low rotation such as an idling time. As a result, the running speed of the endless belt which is wound around the driving pulley fluctuates finely On the other hand, the rotary shaft 3 of the alternator which is driven to rotate through the driven pulley by the use of this endless belt does not fluctuate so rapidly owing to the inertia masses of the rotary shaft 3 and a rotor, or the like, fixed to this rotary shaft 3. Thus, when the driven pulley is merely fixed to the rotary shaft, the endless belt and the driven pulley are inclined to rub each other in the both directions upon a fluctuation in the angular speed of rotation of the crank shaft. As a result, the stress works on the endless belt which rubs this driven pulley repeatedly in different directions, to easily cause a slip between this endless belt and the driven pulley, or to reduce the life of this endless belt.

Accordingly, by employing the pulley device incorporating a one-way clutch for an alternator having a structure as described above as the driven pulley described above, it is arranged such that the force of rotation can be transmitted from the driven pulley to the rotary shaft 3 when the running speed of the endless belt is fixed or on the increase, while the relative rotation is allowed between the driven pulley and the rotary shaft 3 when the running speed of the endless belt is on the decrease. More specifically, when the running speed of the endless belt is on the decrease, the angular speed of rotation of the driven pulley is set to be slower than the angular speed of rotation of the rotary shaft so as to prevent strong friction between the endless belt and the driven pulley in a contact portion therebetween. Thus, the direction of the stress acting on the frictional portion between the driven pulley and the endless belt is fixed so as to prevent a slip between this endless belt and the driven pulley or reduction of the life of this endless belt.

The second reason is to enhance the efficiency in power generation by the alternator. The rotary shaft 3 to which the rotor of the alternator is fixed is driven to rotate by the driving engine of the car through the endless belt and the driven pulley. When a driven pulley of a fixed type is used, if the speed of rotation of the driving engine is rapidly decreased, the speed of rotation of the rotor is also rapidly decreased, whereupon an amount of power generation by the alternator also rapidly decreases. On the contrary, when the pulley device incorporating a one-way clutch for an alternator described above is used as a driven pulley to be attached to the alternator, even if the speed of rotation of the driving engine is rapidly decreased, the speed of rotation of the rotor is gradually decreased due to the force of inertia, and the alternator continues to generate power all the time. As a result, compared with a case in which the driven pulley of a fixed type is used, the kinetic energies of the rotary shaft and the rotor can be effectively utilized, so as to increase an amount of power generation by the alternator.

With the conventional structure described above, the displacement of the clutch retainer 28 in the axial direction is prevented by the paired flange portions 27a, 27b which are provided at the both ends of the clutch outer race 25. More specifically, when the clutch retainer 28 is to be displaced in the axial direction at the time of over-run at which the driven pulley 7a and the sleeve 8 are rotated relatively to each other, an end surface in the axial direction of this clutch retainer 28 and the inner side surface of one 27a (or 27b) of the paired flange portions are brought into contact (sliding contact) to prevent the displacement in the axial direction of the clutch retainer 28. However, in case of the pulley device incorporating a one-way clutch for an alternator as described above, a relative speed of rotation between the pulley 7a and the sleeve 8 may reach several hundred $min^{-1}$ (r.p.m.) to several thousand $min^{-1}$ (r.p.m.) in an extreme case. For this reason, if the both end surfaces in the axial direction of the clutch retainer 28 and the inner side surfaces of the flange portions 27a, 27b are brought into sliding contact as described above, the both end surfaces in the axial direction of the clutch retainer 28 may be easily worn away, or a frictional heat which is generated in the sliding contact portions between the both end surfaces in the axial direction of this clutch retainer 28 and the inner side surfaces of the flange portions 27a, 27b may be excessively high.

Then, when abraded powder which is generated due to the abrasion of the both end surfaces in the axial direction of the clutch retainer 28 is mixed into the grease for lubricating the roller clutch 10, there is a possibility that the lubricating performance of this grease may be deteriorated. Also, when the frictional heat generated in the sliding contact portions becomes excessively high, the grease may be deteriorated by the heat in an early stage. The deterioration of the grease may cause a damage to the durability of the roller clutch 10 undesirably. Note that such a problem occurs in the same manner in a structure which does not comprise the pair of flange portions 27a, 27b even when the both end surfaces in the axial direction of the clutch retainer 28 are brought into sliding contact with another member which is rotated relatively to this clutch retainer 28.

SUMMARY OF THE INVENTION

The rotation transmitting device incorporating a one-way clutch therein according to the present invention has been contrived taking the circumstances as described above into consideration.

According to the present invention, there is provided a rotation transmitting device incorporating a one-way clutch therein which comprises, an inner diameter side member fixed to an end of a rotary shaft, an outer diameter side member in a cylindrical form disposed around the inner diameter side member to be concentric with the inner diameter side member, a one-way clutch disposed between a middle part in the axial direction on the outer peripheral surface of the inner diameter side member and a middle part in the axial direction on the inner peripheral surface of the outer diameter side member for transmitting rotation between the outer diameter side member and the inner diameter side member only when the outer diameter side member has a tendency to relatively rotate in a predetermined direction with respect to the inner diameter side member, and a pair of support bearings disposed between the outer peripheral surface of the inner diameter side member and the inner peripheral surface of the outer diameter side member at a position to pinch this one-way clutch from the both sides thereof in the axial direction for allowing a relative rotation between the inner diameter side member and the outer diameter side member while supporting a radial load applied on this outer diameter side member.

Specifically, in the rotation transmitting device incorporating a one-way clutch therein, a clutch retainer for constituting the one-way clutch is arranged, based on that a part of the peripheral surface of this clutch retainer is brought into engagement directly or through another member with either one of the inner peripheral surface of the outer diameter side member and the outer peripheral surface of the inner diameter side member, to be rotated together with a member disposed on the one peripheral surface. In addition, a convex portion formed in a protruding manner toward the above one peripheral surface at an end portion in the axial direction of the clutch retainer is disposed between a step surface formed on the above one peripheral surface or an end surface in the axial direction of a member fitted and fixed on this one peripheral surface and another step surface formed on the one peripheral surface or an end surface in the axial direction of the other member fitted and fixed to this one peripheral surface so as to regulate a displacement of the clutch retainer in the axial direction, thereby preventing the both end surfaces of this clutch retainer in the axial direction from contacting with a member which is rotated relatively to this clutch retainer.

Furthermore, in a rotation transmitting device corporation a one-way clutch therein of the present invention, a clutch outer race having a pair of flanges extending inward in the radial direction at the both ends in the axial direction thereof may be fitted and fixed into a middle part of the outer diameter side member in the axial direction with one of the peripheral surfaces serving as the outer peripheral surface of the inner diameter side member, and the inner side surfaces of the flanges which are opposited to each other may be approximated to face the both end surfaces in the axial direction of the clutch retainer.

As describe above, in case of the rotation transmitting device incorporating a one-way clutch therein according to the present invention, it is possible to prevent the both end surfaces in the axial direction of the clutch retainer from being brought into contact (sliding contact) with a member which relatively rotates with respect to this clutch retainer. More specifically, according to the present invention, when the clutch retainer has a tendency to displace in the axial direction, prior to the contact of the end surfaces in the axial direction of this clutch retainer with the portion rotating relatively to the clutch retainer, a convex portion provided on an end portion in the axial direction of this clutch retainer is brought into contact with the step surface formed on the above one peripheral surface or an end surface in the axial direction of the member which is fitted and fixed on this one peripheral surface. Since the step surface and the end surface are portions rotating with the clutch retainer, the step surface and the end surface do not rub the contact portion of the convex portion when the one-way clutch overruns. Thus, in case of the rotation transmitting device incorporating a one-way clutch therein according to the present invention, there is no possibility of abrasion of the both end surfaces in the axial direction of the clutch retainer or generation of frictional heat on the both end surfaces in the axial direction of the clutch retainer. For this reason, the abraded powder of the clutch retainer is not mixed into the grease for lubricating the one-way clutch, or this grease is not deteriorated by the heat. Consequently, it is possible to realize a rotation transmitting device incorporating a one-way clutch therein which maintains the state of lubrication of the one-way clutch over a long term satisfactorily and has a sufficient durability.

Furthermore, the structure may be arranged such that a gap is present all the time between the inner side surfaces of the paired round wheel portions formed at the both end portions in the axial direction of the clutch outer race and the both end surfaces in the axial direction of the clutch retainer. For this reason, this gap portion may be used as a grease pool, so as to conduct lubrication of the one-way clutch satisfactorily. More specifically, when the rotation transmitting device incorporating a one-way clutch therein is used, the centrifugal force acts upon the grease which is thick on the gap portion. Then, the grease thus receiving the centrifugal force is diffused uniformly on the inner peripheral surface of the clutch outer race. As a result, it is possible to sufficiently supply the grease into a gap portion between the surfaces of a plurality of locking members for constituting the one-way clutch and the inner peripheral surface of the clutch outer race. For this reason, the state of lubrication of the one-way clutch can be satisfactorily maintained for a long term, so as to realize a rotation transmitting device incorporating a one-way clutch therein which has a sufficient durability.

DESCRIPTION OF THE PREFERRED EMBODIMENTS

Figure 1:
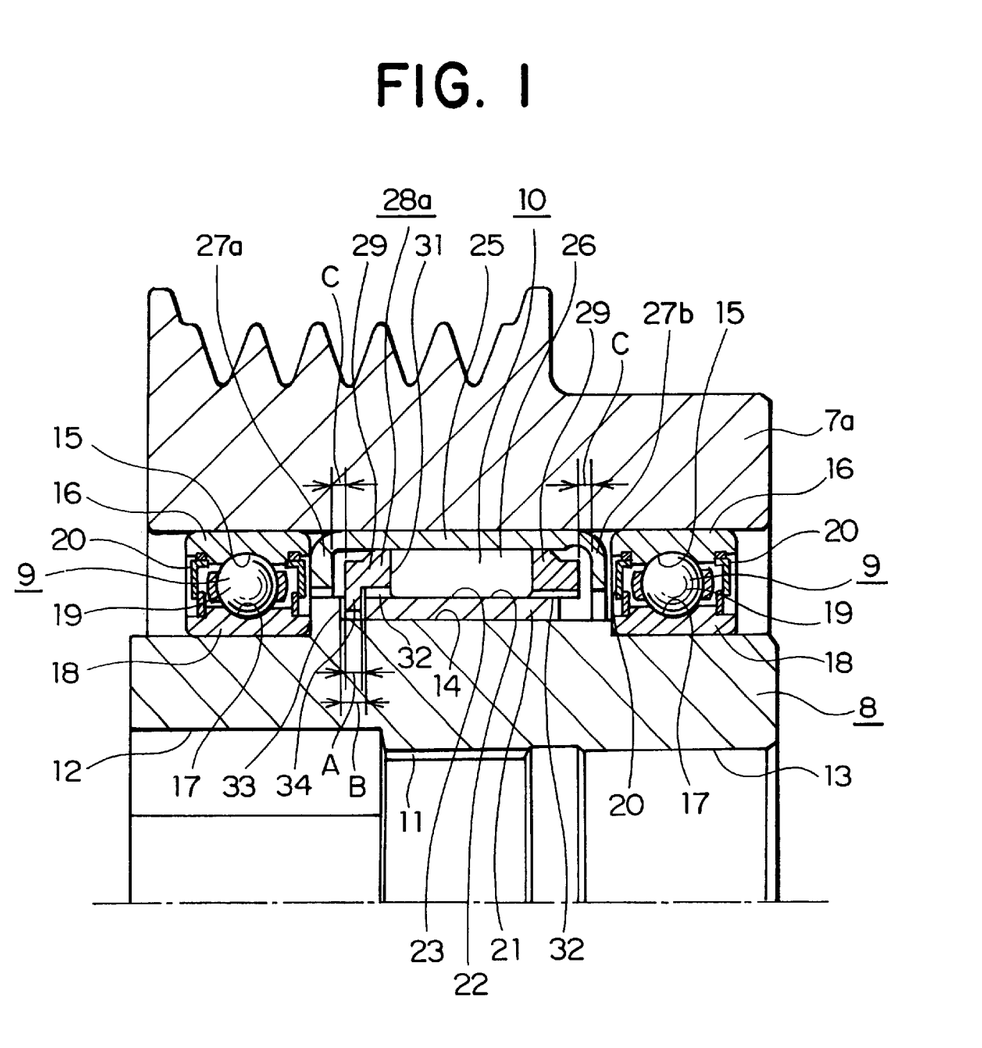
FIG. 1 is a half cross-sectional view for showing the first embodiment of the present invention.

FIG. 1 shows a first embodiment of the present invention. Note that the present invention is characterized in that a displacement in the axial direction of a clutch retainer 28a is restricted to prevent the contact (sliding contact) between the both end surfaces in the axial direction of the clutch retainer 28a and the inner side surfaces of a pair of flange portions 27a, 27b for constituting a clutch outer race 25. Other structures and operations are the same as those of the conventional structure shown in FIGS. 7 to 9, including the arrangement that this clutch retainer 28a is formed to be rotatable together with this clutch inner race 21 due to the engagement between a plurality of convex portions 32, 32 provided on the inner peripheral surface of the clutch retainer 28a and a plurality of concave portions 23 provided on the outer peripheral surface of the clutch inner race 21. For this reason, the same reference numerals and symbols are given to the identical members to those in the conventional structure, and description of the redundant portions will be omitted or will be made briefly. In the following, the present invention will be described centering around the characteristic part thereof.

A step surface 33 is formed on the outer peripheral surface of a part near an end (the portion near the left end portion in FIG. 1) of a large diameter portion 14 which is provided in a middle part in the axial direction of the sleeve 8, by protruding the outer peripheral surface of an end portion of this large diameter portion 14 outwardly in the radial direction. On the other hand, on the inner peripheral surface of an end portion (the left end portion in FIG. 1) of the clutch retainer 28a for constituting a roller clutch 10, a convex portion 34 protruding inward in the radial direction is formed along the entire circumference thereof, or at least at one position in the circumferential direction. Then, a part on the tip end side (the inner diameter side) of this convex portion 34 is disposed between the step surface 33 and an end surface (the left end surface in FIG. 1) of the clutch inner race 21 which is fitted and fixed onto a middle part of the large diameter portion 14, whereby a displacement in the axial direction of the clutch retainer 28a is restricted so as to prevent the both end surfaces in the axial direction of this clutch retainer 28a from being brought into contact with the inner side surfaces of the paired flange portions 27a, 27b provided at the both end portions in the axial direction of the clutch outer race 25 which paired flange portions are members for rotating relatively to the clutch retainer 28a. More specifically, the dimensions of the respective members are so regulated that, when the clutch retainer 28a has a tendency to displace in the axial direction, the side surface of the convex portion 34 and the step surface 33 described above or one of the end surfaces of the clutch inner race 21 are brought into contact, so as to avoid the contact between the end surface in the axial direction of this clutch retainer 28a and the inner side surface of one 27a (or 27b) of the paired flange portions.

In this embodiment, in order to effect such restriction, when the thickness of the convex portion 34 in the axial direction is denoted by A, the distance between the step surface 33 and the end surface of the clutch inner race 21 is by B, and the distance between the both end surfaces of the clutch retainer 28a and the inner side surfaces of the flange portions 27a, 27b is by C, respectively, the values for A to C are set to satisfy the relation C>B−A, taking an error in assembly and the assembling performance into consideration. For instance, when a difference B−A is 0 to 0.5 (mm), the distance C is set to be larger than 0.05 (mm). Note that the step surface 33 and the end surface of the clutch inner race 21 are the portions rotating together with the clutch retainer 28a. For this reason, when a side surface of the convex portion 34 and the step surface 33 or one of the end surfaces of the clutch inner race 21 are brought into contact as described above and the roller clutch 10 is overrun, the contact portions of the both surfaces do not rub each other. Moreover, if the dimensions and the positional relations of the respective parts can be strictly regulated without considering an error in assembly, the object of the present invention can be attained by satisfying the relation C>(B−A)/2. In this case, however, it should be arranged such that the distances C between the clutch retainer 28a and the flange portions 27a, 27b are equal to each other in a state in which the convex portion 34 is disposed at a neutral position in the direction of displacement.

As described above, in case of a pulley device incorporating a one-way clutch of the present invention, it is possible to prevent the both end surfaces of the clutch retainer 28a from being brought into contact (sliding contact) with the inner side surfaces of the paired flange portions 27a, 27b which are rotated relatively to this clutch retainer 28a. Thus, the both end surfaces in the axial direction of this clutch retainer 28a are not abraded, or the frictional heat is not produced on the both surface portions in the axial direction of this clutch retainer 28a. As a result, it is possible to prevent the abraded powder of the clutch retainer 28a from being mixed into the grease for lubricating the roller clutch 10 or this grease from being exposed to high temperature, so as to avoid earlier deterioration of this grease.

Furthermore, in case of the present embodiment, a gap is present all the time between the inner side surface of each of the paired flange portions 27a, 27b and each of the end surfaces in the axial direction of the clutch retainer 28a. For this reason, this gap portion is used as a grease pool so that lubrication of the roller clutch 10 can be conducted sufficiently. That is, when the pulley device incorporating a one-way clutch is used, the centrifugal force works on the grease which gathers in this gap portion. Then, the grease thus receiving the centrifugal force is diffused uniformly over the inner peripheral surface of the clutch outer race 25. As a result, the grease can be fully supplied into the spaces between the rolling surfaces of a plurality of rollers 26 for constituting the roller clutch 10 and the inner peripheral surface of the clutch outer race 25, which spaces are parts requiring the grease at the time of overrun at which the driven pulley 7a and the sleeve 8 are rotated relatively to each other. For this reason, it is possible to realize a pulley device incorporating a one-way clutch which maintains the state of lubrication of the roller clutch 10 excellently over a long term and has a sufficient durability.

Though the convex portion 34 is disposed on one end side of the clutch retainer 28a in the foregoing embodiment, this convex portion 34 may be disposed on the other end side (the right end side in FIG. 1) of the clutch retainer 28a.

Figure 2:
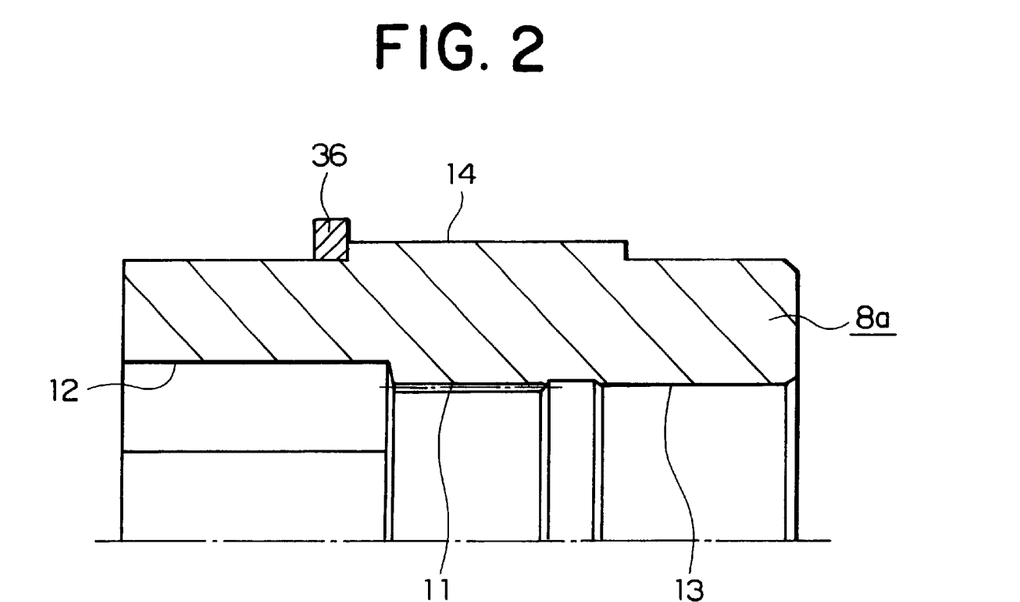
FIG. 2 is a half cross-sectional view for illustrating the second embodiment, only with the essential portion taken out from the embodiment.
Figure 3:
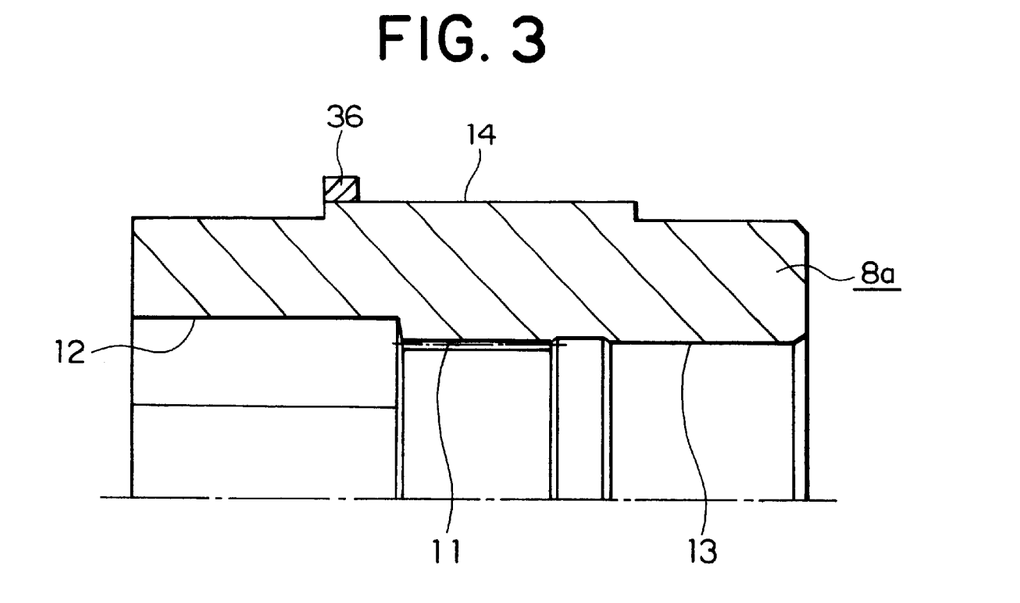
FIG. 3 is a view for illustrating the third embodiment, in the same manner as that for FIG. 2.

Next, FIGS. 2 to 3 show second and third embodiments of the present invention. In these second and third embodiments, the step surface 33 (see FIG. 1) is not provided on the outer peripheral surface near the end (the left end in FIGS. 2 and 3) of the large diameter portion 14 which constitutes the sleeve 8a, and the outer peripheral surface of this large diameter portion 14 is formed in a simple cylindrical shape along the entire length in the axial direction. Instead, an annular restricting member 36 having a rectangular cross section is interference-fitted and fixed typically onto a part which is near one end of the outer peripheral surface of the sleeve 8a and adjacent to the large diameter portion 14 (in case of the second embodiment shown in FIG. 2) or an end portion on the outer peripheral surface of this large diameter portion 14 (in case of the third embodiment shown in FIG. 3). Then, it is arranged such that the convex portion 34 (see FIG. 1) of the clutch retainer 28a is disposed between the end surface (the right end surface in FIGS. 2 and 3) in the axial direction of this restricting member 36 and the end surface (the left end surface in FIG. 1) in the axial direction of the clutch inner race 21 (see FIG. 1) which is fitted and fixed onto the large diameter portion 14. In these second and third embodiments, the outer peripheral surface of the large diameter portion 14 can be formed in a simple cylindrical shape along the entire length in the axial direction, so that the material cost and the processing cost of the sleeve 8a can be reduced. Other arrangements and operations in the second and third embodiments are the same as those in the first embodiment described above.

Figure 4:
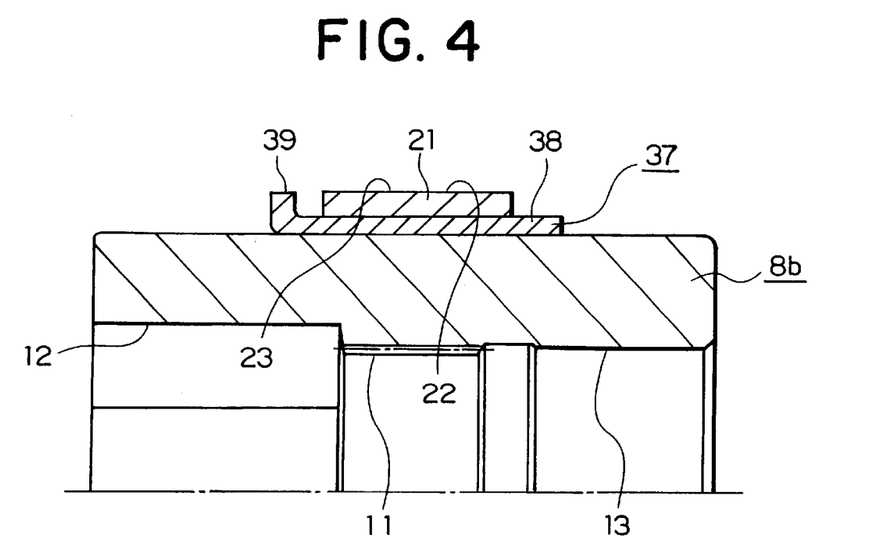
FIG. 4 is a half cross-sectional view for illustrating the fourth embodiment, only with the essential portion taken out from the embodiment.

Next, FIG. 4 shows a fourth embodiment of the present invention. In the fourth embodiment, the large diameter portion 14 (see FIGS. 1 to 3) is not provided on the outer peripheral surface of a sleeve 8b, and the outer peripheral surface of this sleeve 8b is formed in a simple cylindrical shape along the entire length in the axial direction. Then, a second sleeve 37 which is formed in a substantially cylindrical shape as a whole is fitted and fixed onto the outer peripheral surface of a middle part of this sleeve 8a. This second sleeve 37 comprises a cylindrical portion 38 to be interference-fitted and fixed onto the outer peripheral surface of the sleeve 8b and an outward flange portion 39 which is provided on one end portion (the left end portion in FIG. 4) of this cylindrical portion 38 in the axial direction along the entire circumference thereof. Also, the clutch inner race 21 is fitted and fixed onto the outer peripheral surface of a middle part of the cylindrical portion 38. Then, in case of the present embodiment, it is arranged such that the convex portion 34 (see FIG. 1) of the clutch retainer 28a is disposed between a side surface (the right side surface in FIG. 4) of the flange portion 39 and one end surface (the left end surface in FIG. 4) in the axial direction of the clutch inner race 21. In case of the present embodiment having such structure, since the outer peripheral surface of the sleeve 8b can be formed in a simple cylindrical shape along the entire length in the axial direction, the material cost and the processing cost of this sleeve 8b can be further reduced. Other arrangements and operations are the same as those in the first embodiment described before.

Figure 5:
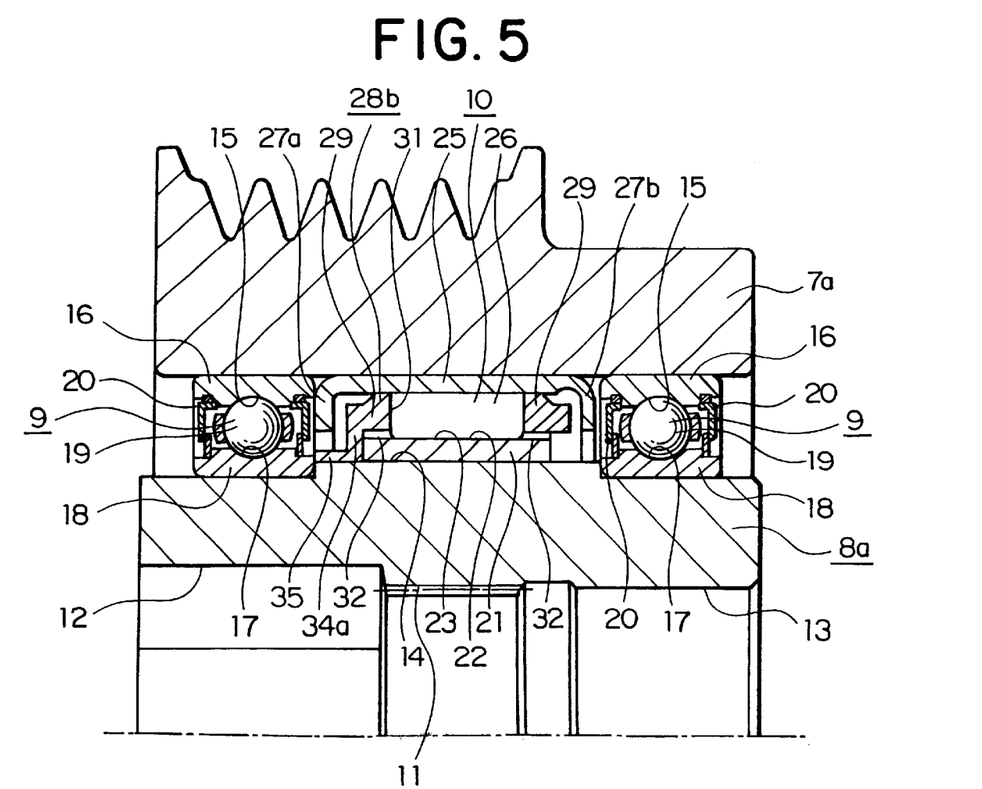
FIG. 5 is a half cross-sectional view for showing the fifth embodiment of the present invention.

Next, FIG. 5 shows a fifth embodiment of the present invention. In case of the fifth embodiment, an eaves-shaped portion 35 which is protruding outward in the axial direction (to the left in FIG. 5) is formed at the tip end of the convex portion 34a which is formed in a protruding manner on one end portion (the left end portion in FIG. 5) of the clutch retainer 28b. Then, this eaves-shaped portion 35 is disposed between the inner end surface (the right end surface) of the inner race 18 for constituting one of the support bearings (the left one in FIG. 5) and one end surface (the left end surface in FIG. 5) of the clutch inner race 21 for constituting the roller clutch 10. With this arrangement, a displacement of the clutch retainer 28b in the axial direction is restricted so as to prevent the both end surfaces of this clutch retainer 28b in the axial direction from being brought into contact (sliding contact) with the inner side surfaces of the paired flange portions 27a, 27b. Other arrangements and operations are the same as those in the first embodiment described above, except that the form and the position of the convex 34a are changed.

Note that, a low clutch is employed as the one-way clutch in the foregoing embodiments. However, the same effects can be obtained even when a conventional one-way clutch of another type, including a sprag clutch or a cam clutch, is used as this one-way clutch of the present invention. When a cam clutch is used, any of such peripheral surfaces as engaging with the cam becomes a cylindrical surface. Accordingly, there is a possibility that a member for constituting the cam clutch is not fitted on any of such peripheral surfaces. In such a case, another step surface is formed directly on a surface serving as this peripheral surface so as to be subjected to a restriction on the position of the clutch retainer in the axial direction. The same effect can be obtained not only when a pair of ball bearings are used as the paired support bearings, but also when a pair of rolling bearings or one ball bearing and one rolling bearing are used as these paired support bearings.

Furthermore, in the foregoing embodiments, the present invention is applied to a pulley for an alternator. However, the present invention is not limited to this. For instance, when the present invention is applied to a rotation transmitting device of a starter motor which constitutes a starting system of a car, a pinion gear which can be meshed with a ring gear formed on the outer peripheral surface of a flywheel is formed on the outer peripheral surface of the outer diameter side member in a cylindrical shape.

Note that, a roller clutch is employed as the one-way clutch in the foregoing embodiments. However, the same effects can be obtained even when a conventional one-way clutch of another type, including a sprag clutch or a cam clutch, is used as this one-way clutch of the present invention. When a cam clutch is used, any of such peripheral surfaces as engaging with the cam becomes a cylindrical surface. Accordingly, there is a possibility that a member for constituting the cam clutch is not fitted on any of such peripheral surfaces. In such a case, another step surface is formed directly on a surface serving as this peripheral surface so as to be subjected to a restriction on the position of the clutch retainer in the axial direction. The same effect can be obtained not only when a pair of ball bearings are used as the paired support bearings, but also when a pair of rolling bearings or one ball bearing and one rolling bearing are used as these paired support bearings.

Since the rotation transmitting device incorporating a one-way clutch therein of the present invention is constituted and operated as described above, it is possible to prevent abraded powder of the clutch retainer from mixing with the grease for lubricating the one-way clutch, or to prevent deterioration of this grease in an earlier stage due to exposure of this grease to high temperature, for example. For this reason, the state of lubrication of the one-way clutch can be excellently maintained over a long term to improve the durability of the one-way clutch.

What is claimed is:

1. A rotation transmitting device incorporating a one-way clutch therein, comprising:

an inner diameter side member fixed to an end portion of a rotary shaft;

an outer diameter side member in a cylindrical form disposed around the inner diameter side member to be concentric with said inner diameter side member;

a one-way clutch disposed between a middle part in the axial direction on the outer peripheral surface of the inner diameter side member and a middle part in the axial direction on the inner peripheral surface of the outer diameter side member for transmitting rotation between the outer diameter side member and the inner diameter side member only when the outer diameter side member has a tendency to relatively rotate in a predetermined direction with respect to said inner diameter side member; and a pair of support bearings disposed between the outer peripheral surface of the inner diameter side member and the inner peripheral surface of the outer diameter side member at a position to pinch this one-way clutch from the both sides thereof in the axial direction for allowing a relative rotation between the inner diameter side member and the outer diameter side member while supporting a radial load applied on this outer diameter side member, which rotation transmitting device incorporating a one-way clutch therein characterized in that:

a clutch retainer for constituting said one-way clutch is arranged, based on that a part of the peripheral surface of this clutch retainer is brought into engagement directly or through another member with one of the inner peripheral surface of the outer diameter side member and the outer peripheral surface of the inner diameter side member, to be rotated together with said member disposed on said one peripheral surface; and a convex portion formed in a protruding manner toward said one peripheral surface on an end portion in the axial direction of said clutch retainer is disposed between a step surface formed on said one peripheral surface or an end surface in the axial direction of a member fitted and fixed onto said one peripheral surface and another step surface formed on said one peripheral surface or an end surface in the axial direction of said other member fitted and fixed onto the same peripheral surface, whereby a displacement of said clutch retainer in the axial direction is regulated to prevent the both end surfaces of this clutch retainer in the axial direction from being brought into contact with a member which is relatively rotated with respect to this clutch retainer;

wherein a clutch outer race is fixedly fitted in the inner peripheral surface of the outer diameter side member and wherein the clutch outer race is integrally formed at both axial ends with a pair of flanges protruded radially inwardly toward the outer peripheral surface of the inner diameter side member;

and wherein axial gaps are formed between inner side surfaces of the flanges and both outer side surfaces of the clutch retainer.

* * * * *